United States Patent [19]

Myers et al.

[11] Patent Number: 4,799,579
[45] Date of Patent: Jan. 24, 1989

[54] CLUTCH AND BRAKE FRICTION ASSEMBLY AND METHOD OF MAKING SAME

[76] Inventors: Paul A. Myers, 2807 Country Club Rd.; Charles O. Jensen, 608 Indian Springs, both of Crawfordsville, Ind. 47933

[21] Appl. No.: 798,979
[22] Filed: Nov. 18, 1985
[51] Int. Cl.$^4$ ............................................. F16D 69/04
[52] U.S. Cl. .......................... 192/107 M; 192/107 R; 188/250 G
[58] Field of Search ...................... 192/107 M, 107 R; 188/250 G, 251 R, 251 A, 258

[56] References Cited

U.S. PATENT DOCUMENTS

| 1,950,260 | 3/1934 | Nelson | 188/250 G |
| 3,477,551 | 11/1969 | Beuchle et al. | 188/251 A |
| 3,526,306 | 9/1970 | Bentz et al. | 192/107 M |
| 4,154,900 | 5/1979 | Kaku et al. | 428/554 |
| 4,569,424 | 2/1986 | Taylor, Jr. | 188/250 G |

FOREIGN PATENT DOCUMENTS

| 56-86244 | 7/1981 | Japan . | |
| 172883 | 6/1983 | Netherlands | 188/251 A |
| 319856 | 10/1929 | United Kingdom | 188/250 G |

Primary Examiner—David A. Scherbel
Assistant Examiner—Caroline D. Dennison
Attorney, Agent, or Firm—Neuman, Williams, Anderson & Olson

[57] ABSTRACT

A clutch and brake friction assembly for a heavy duty vehicle is provided which includes a metal shoe having an exterior backing surface. The surface is provided with a multitude of burr-like protuberances arranged in a predetermined pattern throughout the surface. Molded to the backing surface and mechanically interlocking with the burr-like protuberances thereof is a lamina of friction material.

3 Claims, 1 Drawing Sheet

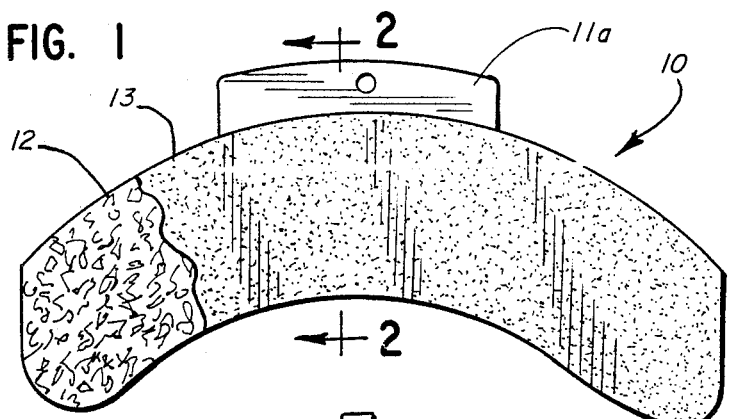
FIG. 1
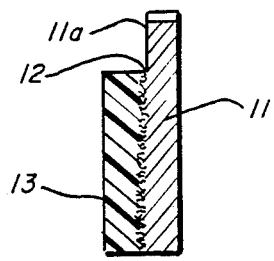
FIG. 2
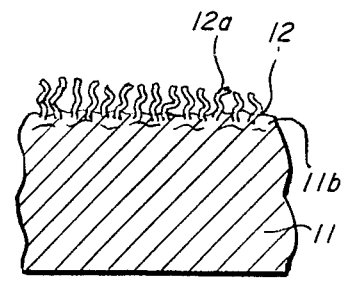
FIG. 3
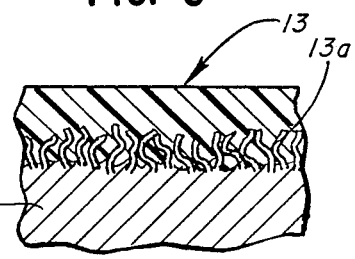
FIG. 4
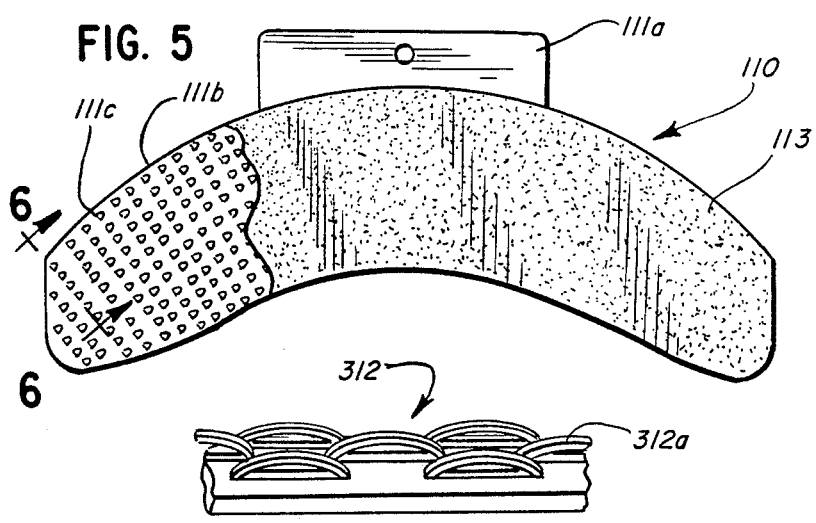
FIG. 5
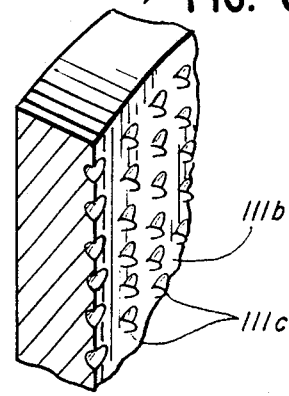
FIG. 6
FIG. 9
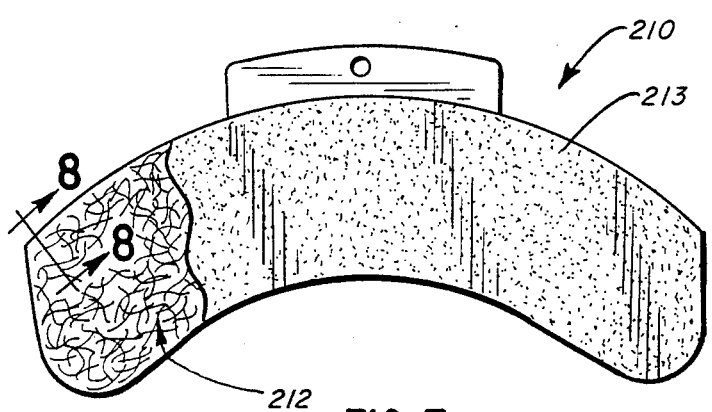
FIG. 7
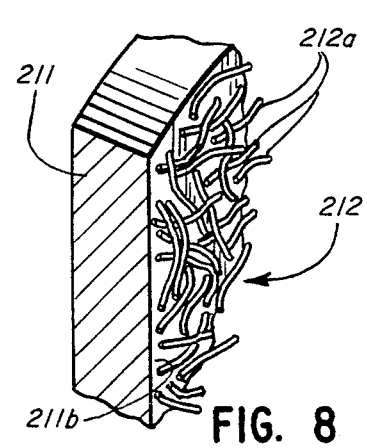
FIG. 8

CLUTCH AND BRAKE FRICTION ASSEMBLY AND METHOD OF MAKING SAME

BACKGROUND OF THE INVENTION

This invention relates to the subject matter of Disclosure Document No. 137,928, filed May 20, 1985.

A market limiting weakness of caliper disc brakes, for example, is the capability of the brake lining to withstand a limited temperature range before the liner bond begins to deteriorate and become detached from the backing surface of the metal shoe. Heretofore, to overcome this problem the liner was frequently riveted to the backing surface; however, such a procedure was undesirable because the wear volume and the surface area of the liner were significantly reduced. Another prior approach to overcoming the problem of attachment of the liner to the backing surface was to have the shoe surface provided with a plurality of relatively large openings into which portions of the friction material flowed to form key plugs when a lamina of friction material was molded and bonded simultaneously onto the shoe surface. This latter procedure, as disclosed in U.S. Pat. Nos. 1,696,821 and 3,513,950 however, was also beset with various shortcomings; namely, the plugs were ineffective in resisting high shearing forces after the bonding adhesive succumb to elevated temperatures. Secondly, the thickness of the friction material lamina was non-uniform resulting in manufacturing problems. Thirdly, the ideal molding conditions frequently conflicted with ideal bonding conditions requiring compromises in processing and a frequent need to add a marriage layer of a third material between the lamina and the shoe surface. Other friction applications presented similar problems. Attachment limitations prevent many clutch and brake materials with energy capacity between that of normal organic materials and fully sintered or brazed materials from working. In some drum lining applications, the combined use of both riveting and bonding was not structurally adequate.

SUMMARY OF THE INVENTION

Thus, it is an object of the invention to provide an improved clutch and brake friction assembly which overcomes the aforenoted shortcomings of prior assemblies of this general type.

It is a further object to provide a clutch and brake friction assembly which is of simple construction, and the liner and backing surface thereof remain attached to one another during operation of the clutch and braking system even when such components are subjected to prolong periods of high temperatures, pressures and stress.

It is a still further object to provide a clutch and brake friction assembly wherein the need for openings being formed in the metal shoe has been eliminated thereby improving the overall strength of the shoe itself.

It is a still further object to eliminate the use of organic bonds and/or rivets to secure the friction lamina to a surface of the metal shoe.

It is a still further object of the invention to provide a laminated clutch and brake friction assembly wherein the strength of the attachment is stronger than the friction material lamina.

Further and additional objects will appear from the description, accompanying drawings, and appended claims.

In accordance with one embodiment of the invention a clutch and brake friction assembly is provided for use on heavy duty vehicles which includes a metal shoe having an exterior backing surface provided with a multitude of interstices and outwardly projecting burr-like protuberances arranged throughout the backing surface. A lamina of friction material is molded onto the backing surface whereby portions of the lamina will adhere thereto by filling the interstices and mechanically interlock with the burr-like protuberances provided on the backing surface.

DESCRIPTION

For a more complete understanding of the invention reference should be made to the drawings wherein:

FIG. 1 is a fragmentary side elevational view of one form of an improved brake friction assembly with a portion of the lamina of friction material removed exposing the protuberances formed on the backing surface of the metal shoe.

FIG. 2 is an enlarged sectional view taken along line 2—2 of FIG. 1.

FIG. 3 is an enlarged sectional view, similar to FIG. 2, but showing the brake friction assembly prior to the lamina of friction material being molded to the backing surface of the metal shoe.

FIG. 4 is a fragmentary sectional view similar to FIG. 3 but on a larger scale and showing more clearly how portions of the molded lamina of friction material mechanically interlock with the multitude of burr-like protuberances and fill, the interstices and fissures formed on the backing surface of the metal shoe.

FIG. 5 is a fragmentary side elevational view similar to FIG. 1 but of a second form of the improved brake friction assembly.

FIG. 6 is an enlarged fragmentary perspective view of the exterior backing surface of the metal shoe embodied in the brake friction assembly of FIG. 5.

FIG. 7 is a fragmentary side elevational view similar to FIG. 1 but of a third form of the improved brake friction assembly.

FIG. 8 is an enlarged fragmentary perspective view of the exterior backing surface of the metal shoe embodied in the brake friction assembly of FIG. 7.

FIG. 9 is an enlarged fragmentary perspective view of a metallic lamina which may be fused by sintering or brazing to the shoe backing surface prior to the friction material being molded thereto.

Referring now to the drawings and more particularly to FIG. 1, one brake friction assembly 10 of a pair of brake friction assemblies is shown, which is of the type utilized in a conventional caliper type disc brake system for vehicles, such as over-the-highway heavy duty trucks and the like. In vehicles of this type, a reliable brake system is essential because of the weight and momentum of the truck, when loaded and operating at normal speeds. For economic reasons, it is important that there are prolonged periods between brake liner replacement so that operation of the truck is only infrequently interrupted and then for only short periods of time.

The embodiment of the improved friction assembly 10, shown in FIGS. 1-4, includes a shoe 11, formed of metal, or a high strength composite material, and having a quasiboomerang configuration with a bracket 11a disposed at substantially mid-length and projecting from the convex side of the shoe for attachment to a component of the hydraulic or pneumatic operating mechanism, not shown, of the braking system. Other means besides bracket 11a may be utilized for this purpose. The shape and size of the friction assembly will depend upon the type of braking system incorporated in the vehicle. The shoe 11 is preferably of metal or a high strength composite material and is provided with a substantially planar surface 11b on which is fused metal particles 12 (e.g. metal chips) preferably arranged in predetermined overlapping, relation (e.g., random or orderly) so that a multitude of outwardly extending burr-like protuberances 12a result, see FIG. 3. Besides forming the protuberances 12a, the metal particles fuse together or agglomerated to form a multitude of interstices and fissures. Where the shoe is non-metallic or of a synthetic material, the fused particles 12 may be of a suitable nonmetallic or synthetic material. In other forms of the improved friction assembly a stamped and formed piece 312 (FIG. 9) of sheet steel approximately 0.06" thick may be substituted for the chips or wire forms to be hereinafter described more fully. Piece 312, as noted, is provided with a plurality of stirrup-like struckout protuberances 312a formed on one surface thereof, see FIG. 9.

Overlying and molded to the shoe surface 11b and the fused or agglomerated metal particles 12 is a lamina 13 of suitable friction material (e.g. a mixture containing 50% or more by weight metals such as steel wool etc.; thermosetting binder; and minerals barytes powder, aluminum oxide grit, graphite and other additives common to friction materials). During the molding operation portions 13a of the lamina 13 fill the interstices and fissures and mechanically interlock therewith as well as mechanically interlock with the outwardly extending protuberances 12a. The result of such mechanical interlocking is that an extremely strong bond is created between the lamina 13 and the backing surface which is substantially less affected by high temperatures (e.g. 1100°± F.) and high shearing forces (e.g. 640–980 psi). Because of such a bond, the lamina 13 will wear out before the bond is broken.

To effect proper fusing or agglomeration of the metal particles to themselves and to the backing surface as well, it is preferred that, where a flux material (e.g. ammoniam fluorobate) has been dusted over the backing surface, the particles be spread out over the backing surface 11b, and then a brazing powder-like mixture of various metal granules (e.g., copper, alone or in combination with silver, tin, zinc and similar metals or combinations thereof) dusted over the spread out metal particles before the latter and the backing surface are subject in some cases to predetermined pressures (e.g. 1–20 psi) and temperatures (e.g. 1250°± F. or more). Where the temperature exceeds 1300° F., it may be necessary to post heat-treat the metallic shoe or its anchoring surface in order to restore the inherent strength thereof. Where the temperature approaches 2200° F. little or no predetermined pressure is required for good results. The pressure, temperature and time required will vary according to the metals or other materials involved and the environment in which the friction assembly will be used. It may be preferred in some applications that the temperature not exceed the temperature wherein the shoe metal will incur an undesirable metallurgical change which would reduce the inherent strength of the metal. It has been found that successful fusing can be accomplished by the proper selection of fusing powder under temperatures from about 1300° F. to about 2200° F. The lower temperature can be used to significantly reduce annealing of the metal shoe. With high temperatures post heat treating may be desirable. In some cases, the flux material may be omitted when brazing is accomplished in a reducing atmosphere (e.g., nitrogen 95% by volume, hydrogen 5% by volume).

Subsequent to the backing surface and fused metal particles having cooled to approximately room temperature, the metal shoe (if required, coated with an adhesive and dried) is positioned with the backing surface thereof facing the mold charged with the required amount of friction material powder in an unmolded state. The required heat and pressure (e.g. 260°± F.–320°± F. and 2000–12,000 psi) are then applied to the mold to effect flow and curing of the friction material so as to form the exposed lamina 13. During the molding and curing of the friction material, the latter fills the interestices and fissures formed by the fused metal particles and is mechanically locked therein and also the friction material surrounds and is mechanically locked to the outwardly extending burr-like protuberances 12a formed by the fused metal particles 12. The thickness of the lamina 13 is normally within the range of from about ⅜" to about 1" for brakes and significantly thinner for clutches.

In some instances it has been found that a suitable metallic foil may be substituted for the brazing powder. In other instances a paste-like mixture of the flux material and the powder-like mixture of various metal granules can be substituted for the brazing powder.

FIGS. 5 and 6 shows a second form of brake friction assembly 110 wherein in lieu of the fused or sintered metal particles, the backing surface 111b of the metal shoe 111 is gouged or scarred resulting in burr-like protuberances 111c being formed directly on the exposed backing surface 111b. Besides the protuberances 111c, there results corresponding depressions or pocks 111d on the backing surface. The protuberances and resulting depressions are of irregular shapes and are preferably arranged in random relation throughout the backing surface.

Subsequent to the gouging of the backing surface, a lamina 113 of friction material is molded thereto in a manner as previously described with portions of the lamina filling the depressions or pocks and mechanically interlocking with the protuberances 111c.

A third form of friction assembly 210 is shown in FIGS. 7 and 8. In place of the irregular metal chips or shavings (e.g. −6 to +12 screen sized cast iron, steel lathe chips) being spread over the backing surface of the metal shoe as described in relation to assembly 10, FIG. 1, sections of kinked or bent wire and/or metal fibers 212 are placed thereon in overlapping fashion so as to build up a layer which is then agglomerated and fused to the backing surface 211b. The kinks or bends formed in the wire sections prevent the sections from lying flat against the braking surface and thus provide a multitude of interstices and the ends 212a of the wire sections form burr-like protuberances to which portions of the molded friction material lamina 213 mechanically interlock.

Various other types of materials may be utilized for this purpose which will effectively fuse onto the backing surface of the metal shoe; such as a brush-like unit having deformed metallic bristles projecting outwardly from the backing surface, or a piece of corrugated hardware cloth (e.g., metal screen or mesh) overlying the backing surface and conforming substantially to the shape thereof.

The method of forming the improved brake assembly 10, shown in FIGS. 1–4 involves: (a) cleaning the backing surface of the shoe by removing therefrom dirt, oil and/or scale with a suitable washing solution (e.g. tricloroethylene) and/or a shot blast; (b) dusting the cleaned backing surface with a flux material (e.g., ammonium fluorobate); (c) spreading over the entire dusted backing surface metal particles (e.g., chips, shavings, kinked or bent wire sections, deformed brush-like metal bristles, corrugated hardware cloth, or metal fibers) with the particles themselves being arranged in either random or orderly overlapping relation; (d) dusting the metal particles with a powderlike mixture of metal granules (e.g., 80% copper, 10% tin, and 8% zinc by weight) while the shoe with the metal particles spread upon the backing surface is set in or passed through a suitable oven; (e) brazing the accommodated shoe at a temperature from about $1650° \pm$ F. to $1800° \pm$ F. and within a pressure range of about 1 psi to about 20 psi in a non-oxidizing atmosphere so as to form an agglomeration having a multitude of interstices and fissures and outwardly extending burr-like protuberances; (f) cool the brazed shoe (if required, coated with an adhesive and dried) (g) place the cooled shoe with the backing surface thereof facing the mold cavity with the required amount or charge of the aforementioned type friction material; and (h) heat under pressure the charge of friction material so that the latter will fill the multitude of interstices and fissures formed by the sintered metal particles and mechanically interlock therewith and with the multitude of burr-like protuberances and then cause the friction material to be curred.

In place of step (d) relating to dusting the powderlike mixture of metal granules, the fusing media can be pre-fused to the backing surface.

While the invention has heretofore been described in relation to brake friction assemblies, it is not intended to be limited thereto but may be utilized in clutch systems as well.

Thus, an improved clutch and brake friction assembly and a method of forming same have been disclosed which result in a friction assembly wherein there is a superior attachment between the lining or lamina of friction material and the backing surface of the shoe which will withstand inordinately high temperatures and shear forces or pressures for prolonged periods of time.

We claim:

1. A clutch and brake friction assembly suitable for use on heavy duty vehicles such as over-the-highway trucks and the like comprising
   (a) a metallic shoe having an exposed continuous planar backing surface;
   (b) a first lamina overlying said backing surface and comprising a multitude of metallic fibers agglomerated in overlapping fashion and metallurgically fused to one another and to said backing surface so as to form a plurality of interstices and a multitude of protuberances outwardly-extending from said backing surface; and
   (c) a second lamina of friction material overlying said first lamina, juxtaposed portions of said second lamina filling said interstices and being mechanically interlocked with the outwardly-extending protuberances so as to secure said second lamina to said first lamina and said backing surface.

2. The clutch and brake friction assembly of claim 1 wherein the multitude of metallic fibers comprises discontinuous sections of bent or kinked metal wire agglomerated in an overlapping relation, the bends and kinks preventing the sections from lying flat against said backing surface to which they are fused.

3. The clutch and brake friction assembly of claim 1 wherein the multitude of metallic fibers includes metal chips and shavings arranged in an overlapping relation.

* * * * *